Feb. 23, 1971     G. G. EVANS ET AL     3,564,913
BELT TENSIOMETER APPARATUS
Filed Aug. 13, 1968
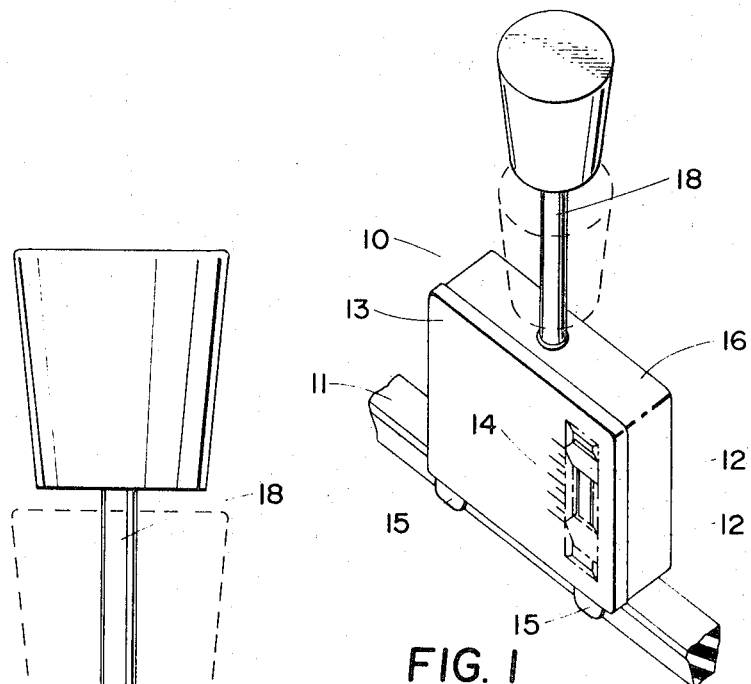
FIG. 1
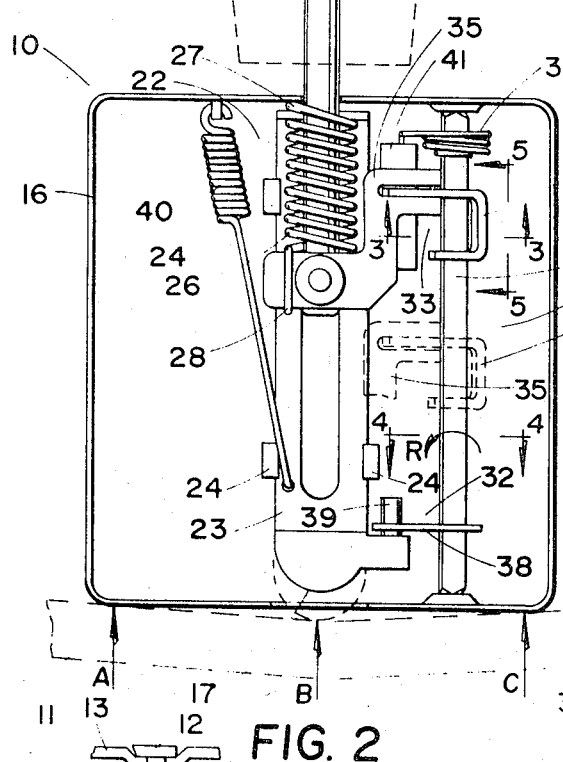
FIG. 2
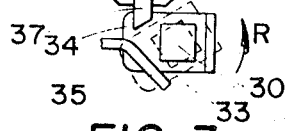
FIG. 3
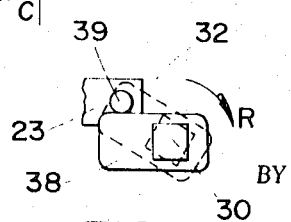
FIG. 4
FIG. 5
FIG. 6
FIG. 7
INVENTOR.
GEORGE G. EVANS
GLENN A. BEAVERS
BY Raymond Fink
ATTORNEY

United States Patent Office 3,564,913
Patented Feb. 23, 1971

3,564,913
BELT TENSIOMETER APPARATUS
George G. Evans, Denver, Colo., and Glenn A. Beavers, Wichita, Kans., assignors to The Gates Rubber Company, Denver, Colo., a corporation of Colorado
Filed Aug. 13, 1968, Ser. No. 752,371
Int. Cl. G01l 5/06
U.S. Cl. 73—144                                          16 Claims

ABSTRACT OF THE DISCLOSURE

A tensiometer with a force measuring mechanism that is extensible from a housing. The force measuring mechanism and housing define a three point reference system for determining tension in a belt. A pointer is slideably mounted to the housing and is linked to the force measuring mechanism. Linkage between the force measuring mechanism and pointer is terminated by a lost motion mechanism that is sensitive to belt tension.

---

This invention relates to apparatus for determining tension in a drive belt by deflecting the belt, but more particularly, this invention relates to tensiometer apparatus having scale readout and retention means to indicate the tension of the belt being tested.

Because of the sophistication and demands of present day belt drive systems, it is becoming increasingly important to properly adjust belt tension to insure maximum bearing life, maximum belt and sheave life, and of more importance, to insure that rated torque is being transmitted by the belt. The automotive field is exemplary of the increasing demands being made of belt drive systems. Air conditioning, power steering, air pump and alternator are included among the many components of a sophisticated automotive belt drive system. Typically, tensiometers being used to measure belt tension of an automotive belt drive system are somewhat difficult to operate. Some tensiometers require a delicate application of force, usually in a hard-to-reach place to deflect the belt to a three-point contact position where visual alignment is made with a reference point, a signal light goes, on a click or even a buzzer sounds. Other tensiometers require physical engagement with the belt when the tensiometer scale is read.

Included among the objects of this invention is to provide a portable tensiometer apparatus that is easy to use, even in hard-to-reach places.

Another object of this invention is to provide a tensiometer apparatus having scale readout means that is not dependant on devices signaling alignment of the belt with respect to the gauge.

Still another object of this invention is to provide a tensiometer apparatus having a scale retention means so that the tensiometer may be removed from the tested belt without disrupting the scale reading.

This invention determines belt tension by measuring the force required to deflect a belt a predetermined amount. The amount of belt deflection is established by a three point reference in linear alignment. The deflecting force is applied as the center point of contact to the belt by means of a force measuring mechanism. A lost motion mechanism advances a tension scale pointer in a fixed relation with the spring bias until the belt has been deflected the predetermined amount. The lost motion mechanism automatically disengages the tension scale pointer precisely at the predetermined point of belt deflection. The scope of this invention is best understood in conjunction with the appended drawings and descriptions thereof.

FIG. 1 is an isometric view of the tensiometer apparatus positioned on a span of belt to test for tension in the belt.

FIG. 2 is a view of the tensiometer apparatus positioned on a span of belt but with the front removed to expose the lost motion mechanism for the tension scale pointer; and the force measuring mechanism.

FIG. 3 is a sectional view taken along the line 3—3 to illustrate the pointer release means of the lost motion mechanism.

FIG. 4 is a sectional view taken along the line 4—4 to illustrate the triggering means of the lost motion mechanism.

FIG. 5 is a sectional view taken along the line 5—5 to illustrate the automatic resetting means of the lost motion mechanism.

FIG. 6 is a sectional view showing a variation in the pointer release means of the lost motion mechanism.

FIG. 7 is a sectional view showing a variation in the triggering means of the lost motion mechanism.

For purposes of illustration, the position of the tensiometer component parts before activation is shown in solid form whereas movement of some parts after activation is shown in dotted line form.

In use, the tensiometer 10 is positioned on the belt 11 as illustrated by FIGS. 1 and 2. The scale pointer 12 is manually set to the upward position which is the start position. The pointer 12 is slideably mounted through a slot opening in the cover 13 with sufficient friction such that it will stay in any displaced position along the calibrated scale 14. Ears 15 facilitate easy alignment of the tensiometer 10 along the belt longitudinal axis by abutting the side of the belt as exemplified in FIG. 1. The tensiometer 10 operates on a three-point reference system along the belt 11 longitudinal axis. Portions of the housing 16 form two belt receiving reference points, A and C respectively; and the plunger tip 17 forms the third reference point B when the belt 11 is deflected away from the housing 16 a predetermined amount. A cover 13 separate from the housing 16 is shown for purposes of illustration; however, the cover 13 may be formed as part of the housing 16 thereby requiring the pointer 12 to be slideably mounted through a slot opening in the housing. To test for belt tension, the spring biased plunger rod 18 is displaced in a downwardly fashion toward the belt 11. The pointer 12 will move from its initial position and in a downwardly fashion with the plunger rod 18. The pointer 12 will stop to indicate the measured belt tension on the calibrated scale 14 precisely when the belt 11 has been deflected a predetermined amount as illustrated by the reference point B. The belt 11 may be deflected beyond the reference point B by a continued displacement of the plunger rod 18 in a downwardly fashion but such continued displacement of the plunger rod 18 will not affect the position of the pointer 12 with respect to the calibrated scale 14. In a preferred embodiment of this invention, belt tension is read directly from the calibrated scale 14; however, the calibrated scale 14 may be divided by any convenient unit. For example, the scale 14 may be divided into percentage units where one hundred percent represents maximum downward movement of the pointer 12. Because of differences in flexural rigidity between different types of belts, it may be desirable to have a scale which is to be used in conjunction with a converter table so a scale reading may be converted to tension for a particular type of belt. The use of the tensiometer 10 has been explained with reference to positioning the tensiometer 10 on the outer surface of the belt 11. However, the tensiometer may also be positioned on the inner belt surface to test for belt tension.

Referring o FIGS. 2, 3, 4 and 5; the force measuring mechanism and lost motion mechanism are contained within the housing 16. The force measuring mechanism 22 comprises: a plunger 23 reciprocally mounted to the housing 16 by means of guides 24; a plunger rod 18 reciprocally mounted to the plunger 23; and a spring 26 having one end 27 attached to the plunger 23, and having the other end 28 attached to the plunger rod 18. Application of a downward force on the plunger rod 18 results in a proportional downward force being transmitted through the spring 26, to the plunger tip 17 to overcome the bias spring 40 and deflect the belt 11. The amount of force applied through the spring 26 to deflect the belt to the reference point B is determined by measuring the elongation of the spring 26. The scale pointer 12 is linked to the plunger rod 18 through a lost motion mechanism that disengages the linkage between the plunger rod 18 and scale pointer 12 precisely when the belt 11 is deflected to the reference point B.

The lost motion mechanism 25 comprises: a rotatable shaft 30 mounted at its ends to the housing 16; a shaft spring 31 to bias the rotation of the shaft 30 with respect to the housing 16 as indicated by the arrow R; a trigger 32 that releases the shaft 30 to rotate when the plunger 23 has been displaced downwardly a predetermined amount; and an overlapping linkage 33 between the spring end 28 and the shaft 30, which overlapping linkage 33 comprises a carrier 34 and plunger rod extension 35. The lost motion mechanism provides a lost motion connection between the force measuring mechanism and pointer 12, and serves to stop the pointer 12 at a point along the calibrated scale 14.

When the plunger rod 18 is displaced downwardly, the plunger rod extension 35 is equally displaced in a downwardly fashion. For manufacturing reasons, the plunger rod extension is shown as a separate part; however, the plunger rod 18 may be formed to include the plunger rod extension 35. The carrier 34 is reciprocally captivated to the plunger rod by the plunger rod extension 35 such that a reciprocal displacement of the plunger rod extension 35 will induce an equal reciprocal displacement of the carrier 34, along the shaft 30. The carrier 34 is keyed to rotate with the shaft 30 while still being reciprocally captivated to the plunger rod extension 35. As illustrated by FIG. 3, the carrier 34 engages the pointer lip 37 to move the pointer 12 in a downwardly fashion in fixed relation with the carrier 34. The pointer 12 may be carried in a downwardly fashion by the carrier 34 as long as the shaft 30 is kept from rotating in the direction of the arrow R. Rotation of the shaft 30 will cause a slave rotation of the carrier 34 away from the pointer lip 37 to preclude the pointer 12 from being further carried in a downwardly fashion along the scale 14.

Rotation of the shaft 30, and consequently engagement of the carrier 34 with the pointer 12 is controlled by the trigger 32. Referring to FIGS. 2 and 4, the trigger comprises: a follower 38 attached to the shaft 30, and a latch 39 attached to the plunger 23. When the trigger 32 is in the cocked position, the follower 38 abuts the latch 39 to keep the shaft 30 from rotating in the direction of the arrow R. When the latch 39 is displaced downwardly with the plunger a predetermined amount, the latch 39 will clear the follower 38 to allow the shaft 30 to rotate as illustrated in dotted form in FIGS. 3 and 4. Rotation of the shaft 30 results in disengagement of the pointer 12. A preferred embodiment of this invention uses a set screw for the latch 39 to provide an easy adjustment means of controlling the point at which the follower 38 will clear the latch 39 when the plunger 23 is displaced downwardly.

The trigger 32 is reset by means of the shaft 30, the carrier 34, the plunger return spring 40, and ramp 41. The plunger return spring 40 biases the plunger 23 in an upwardly direction. The plunger 23 through the spring 26, plunger rod 18 and plunger rod extension 35 biases the carrier 34 to an upwardly position. Referring to FIGS. 4 and 5, the carrier 34 is shown in dotted form after the shaft 30 has been allowed to rotate because of activation of the trigger 32. As the carrier 34 is biased in an upward direction, it engages the ramp 41 which causes the shaft 30 to rotate in a direction opposite to the arrow R. The carrier 34 is shown in solid form after it has been returned to the start position. Rotation of the carrier 34 causes a corresponding slave rotation of the follower 38 by the shaft 30. The latch 39 will clear the follower 38 and allow a full return of the plunger 23 when the follower 38 is rotated away to clear the latch 39. The plunger return spring 40 performs the secondary function of keeping the housing reference points, A and C respectively, in contact with the belt 11 when the belt is being tested for tension. When a downward force is applied to the plunger rod 18, a proportional downward force is transmitted through the spring 26 to move the plunger 23 in a downward direction and extend the plunger return spring 40. A downward force is transmitted to the housing 16 by the plunger return spring 40 as it extends. The downward force transmitted to the housing 16 by the spring 40 keeps reference portions A and C in contact with the belt 11 as the belt is tested for tension.

Another preferred embodiment of this invention includes an overlapping linkage 33 as illustrated by FIG. 6. The operation of the overlapping linkage 33 is the same as previously explained. The carrier 44 is keyed to rotate with the shaft 30 while being reciprocally captivated to the plunger rod extension 45.

Still another preferred embodiment of this invention includes a trigger 32 as illustrated by FIG. 7. The follower 46 is keyed to the shaft 30 but the follower 46 is free to reciprocate along the shaft 30. A follower guide 47, attached to the housing 16, provides a reference position for the follower 46 with respect to the housing 16. A follower spring 48 biases the follower 46 to a reference position against the follower guide 47 which thereby establishes a zero tolerance relationship between the relative position of the latch 39 and the follower 46. The operation of the trigger 32 as it affects the functioning of the tensiometer 10, is the same as previously explained.

We claim:

1. A tensiometer apparatus to test for belt tension, comprising:
   a housing;
   a force measuring means mounted to and extensible from said housing, said force measuring means capable of deflecting a portion of the belt away from said housing and measuring the force required to deflect the belt a predetermined amount away from said housing whereby a force applied to said force measuring means is transferred therethrough to deflect the belt;
   belt receiving reference portions formed on the exterior of said housing disposed on opposite sides of, and in substantially linear alignment with, said force measuring means;
   indicating means on said housing to indicate belt tension when a portion of the belt is deflected a predetermined amount away from said housing by said force measuring means;
   a lost motion means mounted to said housing between said force measuring means and said indicating means, said lost motion means providing a lost motion connection from said force measuring means to said indicating means;
   a spring means mounted to said housing and biased against said force measuring means, said spring means providing a force necessary to reset said lost motion means and maintain said belt reference portions in contact with the belt when said force measuring means is extended from said housing; and
   a ramp mounted to said housing to be in alignment with and have its sloping surface toward said lost motion means, said ramp coacting with said spring means and said lost motion means to reset said lost motion means when said force measuring means is unextended from said housing.

2. A tensiometer according to claim 1 wherein the indicating means includes a pointer reciprocally mounted through a slotted opening in said housing, and a scale adjacent to the slotted opening.

3. A tensiometer according to claim 1 and further including at least two ears protruding from said housing and disposed near said reference portions, said ears capable of facilitating alignment of said housing along the belt.

4. A tensiometer apparatus to test for belt tension, comprising:
  a housing having in opposite end portions a plunger rod receiving opening and a plunger receiving opening;
  a force measuring mechanism disposed within and reciprocally mounted to said housing, said force measuring mechanism comprising a plunger mounted within said housing disposed in alignment with the plunger receiving opening, said plunger having an end forming a belt contacting plunger tip which is extensible through the plunger receiving opening and capable of deflecting a portion of the belt away from said housing, a plunger rod reciprocally mounted in linear alingment to said plunger, said plunger rod having one end extending through the plunger rod receiving opening; and spring means biased between said plunger rod and said plunger whereby a force applied to said force measuring mechanism is transferred therethrough to deflect the belt;
  belt receiving reference portions formed on the exterior of said housing disposed on opposite sides of, and in substantially linear alignment with, said plunger tip;
  indicating means on the exterior of said housing to indicate belt tension when a portion of the belt is deflected a predetermined amount away from said housing by said plunger tip;
  a lost motion means disposed within said housing between said force measuring mechanism and said indicating means, said lost motion means providing a lost motion connection from said force measuring mechanism to said indicating means;
  a spring means mounted in said housing and biased against said plunger for providing the necessary force to reset said lost motion means and for maintaining said belt reference portions in contact with the belt when said plunger tip is extended through the plunger receiving opening a predetermined amount; and
  a ramp mounted within said housing to be in alignment with and have its sloping surface toward said lost motion means, said ramp coacting with said spring means to reset said lost motion means when said plunger tip is unextended from said housing.

5. A tensiometer according to claim 4 and further including at least two ears protruding from said housing and disposed near said reference portions, said ears capable of facilitating alignment of said housing along the belt.

6. A tensiometer according to claim 4 wherein the indicating means includes a pointer reciprocally mounted through a slotted opening in said housing, and a scale adjacent to the slotted opening.

7. A tensiometer apparatus to test for belt tension, comprising:
  a housing;
  a force measuring means mounted to and extensible from said housing, said force measuring means capable of deflecting a portion of the belt away from said housing and measuring the force required to deflect the belt a predetermined amount away from said housing whereby a force applied to said force measuring means is transferred therethrough to deflect the belt;
  belt receiving reference portions formed on the exterior of said housing disposed on opposite sides of, and in substantially linear alignment with, said force measuring means;
  indicating means on said housing to indicate belt tension when a portion of the belt is deflected a predetermined amount away from said housing by said force measuring means;
  a lost motion mechanism disposed within said housing to provide a lost motion connection between said force measuring means and said indicating means, said lost motion mechanism comprising a rotatable shaft mounted by its ends to said housing, a shaft spring means mounted in said housing biased against said rotatable shaft for inducing a moment to said rotatable shaft, a carrier for engaging and disengaging said indicating means, said carrier reciprocally captivated to said plunger rod and said carrier reciprocally mounted and keyed to said shaft so rotation of said shaft induces a corresponding angular rotation of said carrier, and a trigger means between said force measuring means and said shaft for triggering rotation of said shaft to disengage said indicating means when said force measuring means has been extended from said housing a predetermined amount;
  a spring means mounted in said housing and biased against said force measuring means to provide a force necessary to reset said trigger means and for maintaining said belt reference portions in contact with the belt when said force measuring means is extended from said housing; and
  a ramp mounted within said housing, said ramp having its sloping surface disposed to engage said carrier and reset said trigger means and said lost motion means in cooperation with said carrier, said shaft and said spring means when said force measuring means is unextended from said housing.

8. A tensiometer according to claim 7 wherein the trigger means includes a latch attached to said plunger and a follower attached to said shaft, said follower abutting said latch to prevent rotation of said shaft until said plunger is extended through the plunger receiving opening a predetermined amount.

9. A tensiometer according to claim 7 wherein the trigger means includes a latch attached to said plunger; a follower keyed to said shaft and reciprocally movable along said shaft, said follower abutting said latch to prevent rotation of said shaft until said plunger is extended through the plunger receiving opening a predetermined amount; a follower guide disposed within and mounted to said housing for providing a guide for said follower; and a spring means biased against said follower for biasing said follower against said follower guide.

10. A tensiometer according to claim 7 and further including at least two ears protruding from said housing and disposed near said reference portions, said ears capable of facilitating alignment of said housing along the belt.

11. A tensiometer according to claim 7 wherein the indicating means includes a pointer reciprocally mounted through a slotted opening in said housing, and a scale adjacent to the slotted opening.

12. A tensiometer apparatus to test for belt tension, comprising:
  a housing having in opposite end portions of plunger rod receiving opening and a plunger receiving opening;
  a force measuring mechanism disposed within and reciprocally mounted to said housing, said force measuring mechanism comprising a plunger mounted to said housing disposed in alignment with the plunger receiving opening, said plunger having an end forming a belt contacting plunger tip which is extensible through the plunger receiving opening and capable of deflecting a portion of the belt away from said housing, a plunger rod reciprocally mounted in linear alignment to said plunger, said plunger rod having one end extending through the plunger rod receiving opening whereby a force applied to said force measuring mechanism is transferred therethrough to deflect the belt;

belt receiving reference portions formed on the exterior of said housing disposed on opposite sides of, and in substantially linear alignment with, said plunger tip;

indicating means on the exterior of said housing to indicate belt tension when a portion of the belt is deflected a predetermined amount away from said housing by said plunger tip;

a lost motion mechanism disposed within said housing to provide a lost motion connection between said force measuring mechanism and said indicating means, said lost motion mechanism comprising a rotatable shaft mounted by its ends to said housing, a shaft spring means mounted in said housing and biased against said rotatable shaft for inducing a moment to said rotatable shaft, a carrier for engaging and disengaging said indicating means, said carrier reciprocally captivated to said plunger rod and said carrier reciprocally mounted and keyed to said shaft so rotation of said shaft induces a corresponding angular rotation of said carrier, and a trigger means between said plunger and said shaft to disengage said indicating means when said plunger tip has been extended through the plunger receiving opening a predetermined amount;

a spring means mounted in said housing and biased against said plunger to provide a force necessary to reset said trigger means and to maintain said belt reference portions in contact with the belt when said plunger is extended through the plunger receiving opening a predetermined amount; and a ramp mounted within said housing, said ramp having its sloping surface disposed to engage said carrier and reset said trigger means and said lost motion means in cooperation with said carrier, said shaft and said spring means when said force measuring means is unextended from said housing.

13. A tensiometer according to claim 12 and further including at least two ears protruding from said housing and disposed near said reference portions, said ears capable of facilitating alignment of said housing along the belt.

14. A tensiometer according to claim 12 wherein the indicating means includes a pointer reciprocally mounted through a slotted opening in said housing, and a scale adjacent to the slotted opening.

15. A tensiometer according to claim 12 wherein the trigger means includes a latch attached to said plunger and a follower attached to said shaft, said follower abutting said latch to prevent rotation of said shaft until said plunger is extended through the plunger receiving opening a predetermined amount.

16. A tensiometer according to claim 12 wherein the trigger means includes a latch attached to said plunger; a follower keyed to said shaft and reciprocally movable along said shaft, said follower abutting said latch to prevent rotation of said shaft until said plunger is extended through the plunger receiving opening a predetermined amount; a follower guide disposed within and mounted to said housing for providing a guide for said follower; and a spring means biased against said follower for biasing said follower against said follower guide.

References Cited

UNITED STATES PATENTS

| | | | |
|---|---|---|---|
| 1,597,668 | 8/1926 | Brier | 73—81 |
| 1,670,685 | 5/1928 | Marks | 73—81 |
| 1,802,685 | 4/1931 | Trier | 73—81 |
| 1,875,862 | 9/1932 | Fair | 73—81 |
| 3,171,278 | 3/1965 | Howard, Jr. | 73—144 |
| 3,296,857 | 1/1967 | Kaczeus | 73—144X |
| 3,352,253 | 11/1967 | Howard | 73—144 |

FOREIGN PATENTS

| | | | |
|---|---|---|---|
| 10,415 | 11/1927 | Australia | 73—81 |

CHARLES A. RUEHL, Primary Examiner